Patented Jan. 28, 1941

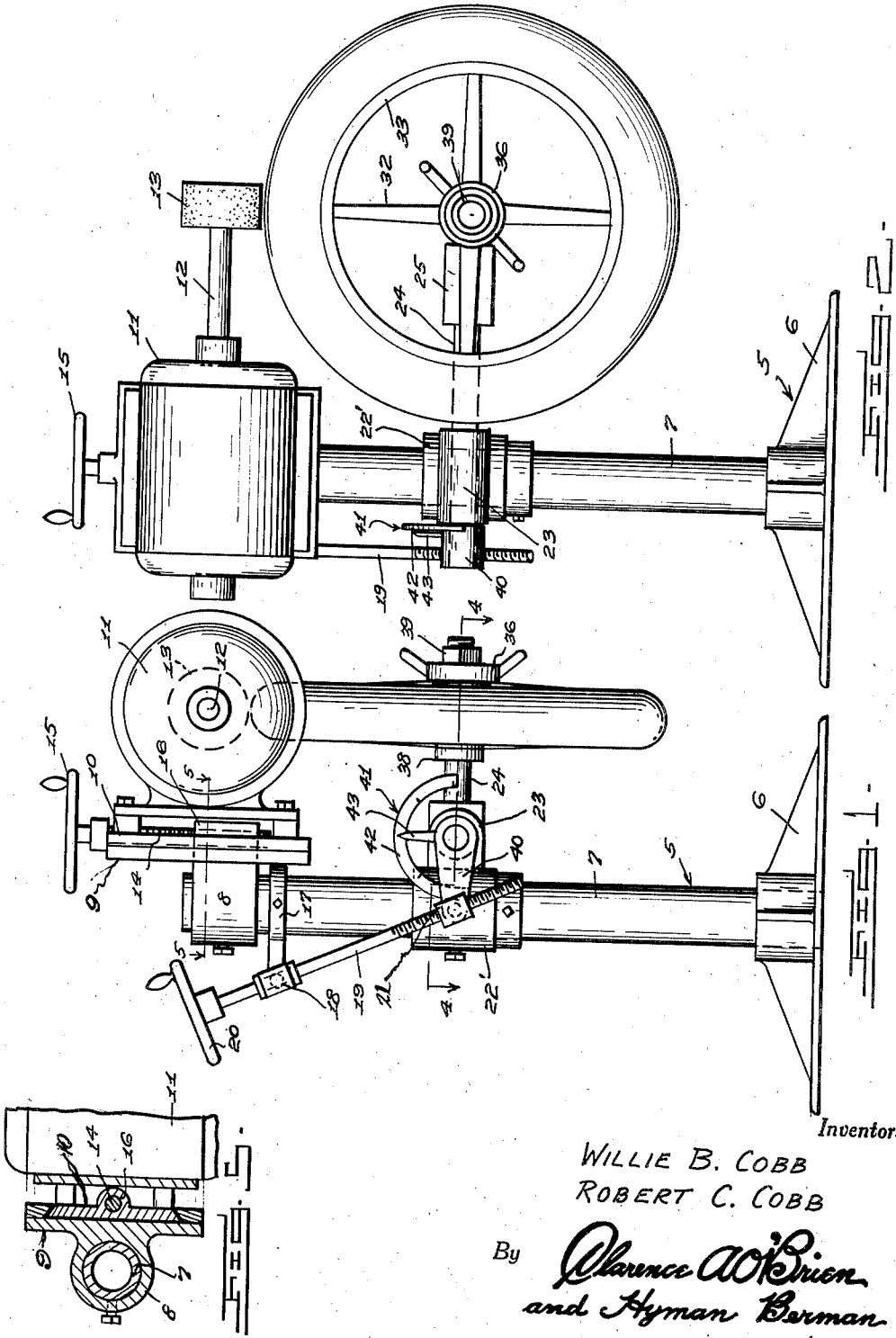

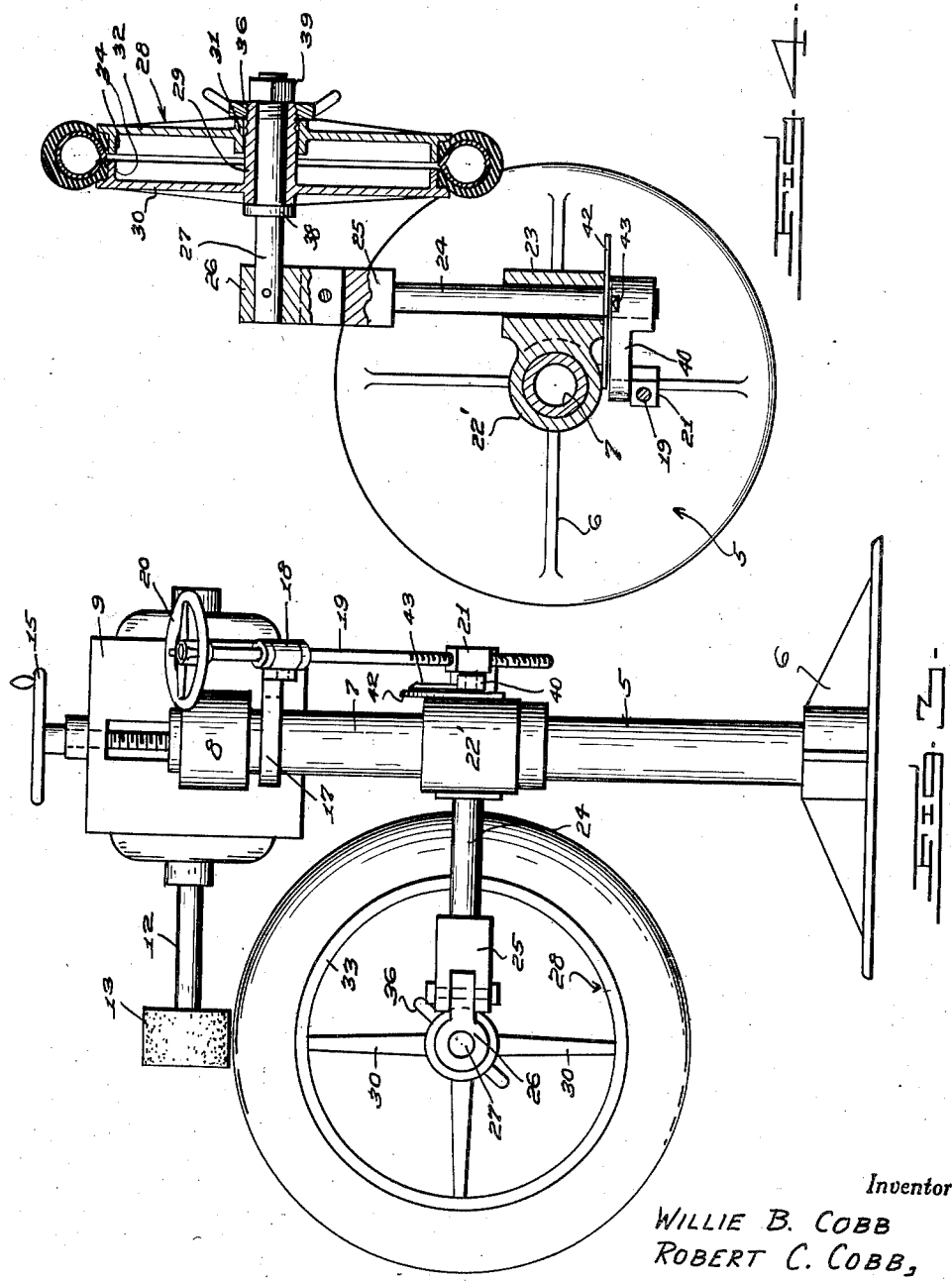

2,230,027

UNITED STATES PATENT OFFICE 2,230,027

TIRE BUFFING MACHINE OR LATHE

Willie B. Cobb and Robert C. Cobb, Reidsville, N. C.

Application January 25, 1940, Serial No. 315,578

3 Claims. (Cl. 29—76)

This invention relates to a tire buffing machine or lathe, and has for the primary object the provision of a device of this character which besides adjustably supporting a power driven buffing element or cutter will also support a tire for conditioning by the buffing element or cutter preparatory to retreading and which will permit the tire to be rotated relative to the buffing element or cutter and also tilted in opposite directions to bring the tire into position so that its entire worn tread circumferentially as well as transversely thereof may be acted on by the buffing element or cutter.

With these and other objects in view, the invention consists in certain novel features of construction, combination and arrangement of parts to be hereinafter more fully described and claimed.

For a complete understanding of our invention, reference is to be had to the following description and accompanying drawings, in which—

Figure 1 is a rear elevation illustrating a tire buffing machine or lathe constructed in accordance with our invention.

Figure 2 is a side elevation illustrating the same.

Figure 3 is a side elevation illustrating the opposite side of the machine from that shown in Figure 2.

Figure 4 is a sectional view taken on the line 4—4 of Figure 1.

Figure 5 is a sectional view taken on the line 5—5 of Figure 1.

Referring in detail to the drawings, the numeral 5 indicates a support which includes a base 6 and a vertically arranged post 7. A casting 8 is mounted on the upper end of the post and has secured thereto a vertically arranged plate 9 and slidably mounted for vertical movement on the latter is a plate 10 on which is removably mounted an electric motor 11, the shaft of which is indicated by the character 12 and is disposed horizontally and has secured thereto a buffing element or cutter 13. The plate 9 has journaled thereto a feed screw 14 equipped with a hand wheel 15 for the rotation thereof. A feed nut 16 is in mesh with the feed stem 14 and is secured on the plate 10 whereby on the rotation of the hand wheel 15 in opposite directions the electric motor and the buffing element or cutter carried thereby may be raised and lowered.

A collar 17 is adjustably mounted on the post and below the casting 8 and has pivoted thereto a journal 18 which rotatably supports a feed shaft 19, the latter having secured to its upper end a hand wheel 20 for the rotation thereof in opposite directions. A feed nut 21 is threaded on the feed shaft 19.

A casting 22' is mounted on the post 7 below the collar 17 and includes a journal 23 in which is journaled a shaft 24 having a bifurcated head 25 at one end to which is secured a block 26 having an opening to receive a wheel supporting shaft 27. The shaft 27 is secured in the block 26 in any well known manner and has journaled thereon a tire carrying wheel 28 which can be easily disassembled or removed from the shaft 27 when desired and is adapted to support tires of the pneumatic type of various sizes and also in inflated condition to be acted on by the buffing element or cutter for the purpose of conditioning said tires preparatory to retreading.

The wheel 28 includes a hub 29 on which are formed radially extending spokes 30. A sleeve 31 is removably mounted on the hub 29 and has integral therewith radially extending spokes 32. The spokes 30 and 32 are connected by annular rims 33 which have cast integrally therewith opposed tire supporting flanges 34 arranged inwardly of the outer peripheries of the rims. A nut 36 is threaded on the hub and engages the sleeve 31 for adjusting the spokes 32 and the rim 33 relative to the rim of the spokes 30 so as to accommodate on the flanges tires of different sizes.

A collar 38 is formed on the shaft 27 for limiting the movement of the hub 29 in one direction on the shaft and a nut 39 is threaded on the shaft to coact with the collar in rotatably supporting the wheel 28 on the wheel shaft 27.

An arm 40 is secured to the shaft 24 and has the feed nut 21 pivoted thereto whereby the shaft 24 may be rotated in opposite directions by the rotation of the hand wheel 20 in opposite directions for the purpose of tilting the wheel 28 and the tire mounted thereon in opposite directions with respect to the buffing element or cutter so that the latter may act transversely of the tire from bead to bead of said tire. The wheel being rotatable will permit the tire to be rotated so that the cutter or buffing element may act on said tire circumferentially thereof.

A protractor 41 is carried by the casting 22' and includes a fixed segment 42 having a scale thereon and a pointer 43 secured to and movable with the shaft 24. Through the use of the protractor the operator may readily tilt the wheel 28 and the tire thereon with respect to the buffing element or cutter by noting the movement of the pointer over the scale of the segment.

It is believed that the foregoing description, when taken in connection with the drawings will fully set forth the construction and advantages of this invention to those skilled in the art to which such a device relates, so that further detailed description will not be required.

Having thus described our invention, what we claim is:

1. In a device of the class described, a vertical support, an electric motor mounted on said support for adjustment vertically thereof and including a horizontally arranged shaft, a rotary tire tool secured to said shaft, a casting on said vertical support and including a journal, a second shaft journaled in said journal, a wheel shaft secured to the second shaft and arranged at right angles thereto, a tire supporting wheel journaled on the wheel shaft and adjustable to accommodate tires of different sizes, and means for rotating said second shaft in opposite directions for tilting the tire on the wheel in opposite directions in relation to said tool.

2. In a device of the class described, a vertical support, an electric motor mounted on said support for adjustment vertically thereof and including a horizontally arranged shaft, a rotary tire tool secured to said shaft, a casting on said vertical support and including a journal, a second shaft journaled in said journal, a wheel shaft secured to the second shaft and arranged at right angles thereto, a tire supporting wheel journaled on the wheel shaft and adjustable to ccommodate tires of different sizes, an arm secured on the second shaft, a feed nut pivoted to said arm, a feed shaft rotatably and pivotally supported on the vertical support and including a hand wheel and having the feed nut threaded thereon.

3. In a device of the class described, a vertical support, an electric motor mounted on said support for adjustment vertically thereof and including a horizontally arranged shaft, a rotary tire tool secured to said shaft, a casting on said vertical support and including a journal, a second shaft journaled in said journal, a wheel shaft secured to the second shaft and arranged at right angles thereto, a tire supporting wheel journled on the wheel shaft and adjustable to accommodate tires of different sizes, an arm secured on the second shaft, a feed nut pivoted to said arm, a feed shaft rotatably and pivotally supported on the vertical support and including a hand wheel and having the feed nut threaded thereon, and a protractor including a fixed scale and a pointer secured to the second-named shaft.

WILLIE B. COBB.
ROBERT C. COBB.